3,362,781
7-(2',5'-DICHLOROPHENYLAZO)-6-METHYL-8-HYDROXY-QUINOLINE DYEING OF METALLIZED POLYOLEFIN FIBERS
Marcel Georges Jirou, Sotteville-les-Rouen, and Joseph Khachoyan, Sierentz, France, assignors to Etablissements Kuhlmann, Paris, France
No Drawing. Filed May 12, 1965, Ser. No. 455,332
Claims priority, application France, May 15, 1964, 974,617
9 Claims. (Cl. 8—42)

ABSTRACT OF THE DISCLOSURE

A process for the coloration of fibres based on a polymer of an alpha-olefine, such as polypropylene, containing a metal, such as nickel, by applying thereto 7-(2',5'-dichlorophenylazo)-6-methyl-8-hydroxy-quinoline, for example in dispersed form.

---

The present invention concerns a process for the coloration of alpha-olefine polymers.

It is difficult to obtain colorations on synthetic fibers based on polymers of alpha-olefines, such as polypropylene which are fast to light and to dry cleaning with chlorinated solvents. It has been proposed to remove this drawback by incorporating metals such as nickel, chromium, cobalt or aluminium, which enable metallisable or lakable dyestuffs to be fixed firmly on the fibers.

French Patent No. 1,320,986 of March 2, 1962, describes the coloration of polypropylene fibers containing metals of groups IIa, IIb or IVb of the Periodic Table, i.e. magnesium, calcium, strontium, barium, cadmium, zinc, tin and lead excluding metals of other groups: e.g. nickel, cobalt, chromium or aluminium, with dyestuffs belonging to the arylazo-8-hydroxy-quinoline series.

It has now been found that 6-methyl-8-hydroxy-quinoline leads to dyestuffs having, like those of 8-hydroxy-quinoline, the following properties: strong intensity of coloring, very good tinctorial affinity at 100° C. for polypropylene fibers containing nickel, excellent fastness to the chlorinated solvents used in dry cleaning, but with the advantage of an improved fastness to light.

These dyestuffs are suitable for the coloration of polypropylene fibers containing metals, especially nickel, which may be in the form of wadding, carded material yarn or fabric. They may be used in dyeing or printing according to the various known industrial techniques, such as dyeing in an open bath, with a circulating apparatus, in a vat or jig or dyeing by foularding. They are advantageously applied to dispersed form. The dyeing may be carried out in an open bath at 90–100° C. without the addition of a vehicle, or at a higher temperature, for example at 130° C., in which case an increase in yield is observed.

The following examples, in which the parts are parts by weight, are given without the invention being limited thereto:

Example 1

25 parts of polypropylene fibers containing nickel were introduced into a dyebath comprising 1000 parts of water, 1 part of the product resulting from the condensation of one mole of castor oil with 40 moles of ethylene oxide, 0.5 to 1 part of acetic or formic acid and a quantity of dispersed dyestuff corresponding to 0.25 to 1 part of a pure dyestuff prepared by coupling one mole of the diazo derivative of 2,5-dichloroaniline with one mole of 6-methyl-8-hydroxy-quinoline. The bath was heated to boiling and kept at the boil for 2 hours. The fibers were rinsed and stripped in an alkaline reducing bath. A scarlet shade with good brightness was obtained which had excellent fastness to chlorinated solvents used in dry cleaning. Further, its fastness to light was better than that obtained with the corresponding dyestuff derived from 8-hydroxy-quinoline of the same depth of color.

When the fibers were dyed for 1 hour at 130° C., a deeper scarlet with a more reddish shade was obtained than at 100° C.

Example 2

25 parts of polypropylene fibers containing nickel were introduced into a dyebath analogous to that of Example 1, but containing a quantity of dispersed dyestuff corresponding to 0.25 to 1 part of one of the pure dyestuffs mentioned in the table below. The bath was heated to the boil, maintained at this for 2 hours, and the fibers were rinsed and stripped in an alkaline reducing bath.

All the shades obtained had an excellent fastness to the chlorinated solvents used in dry cleaning. Their fastness to light was, in general, superior to that of the corresponding dyestuffs derived from 8-hydroxy-quinoline.

| Diazotisable base | Coupling compound | Shade |
|---|---|---|
| Aniline | 6-methyl-8-hydroxy-quinoline. | Yellow-brown. |
| 2-chloro-aniline |  | Brown-red. |
| 3-chloro-aniline |  | Orange. |
| 3-chloro-2-methyl-aniline |  | Orange brown. |
| 5-chloro-2-methoxy-aniline |  | Red-brown. |
| 2,4-dimethyl-aniline |  | Chestnut. |
| 2,6-dimethyl-aniline |  | Orange brown. |

Example 3

A printing paste was prepared with 1000 parts of tragacanth starch thickener, 5 parts of acetic or formic acid and a quantity of dispersed dyestuff corresponding to 5 to 10 parts of a pure dyestuff prepared by coupling one mole of the diazo derivative of 2,5-dichloro-aniline with one mole of 6-methyl-8-hydroxy-quinoline. A fabric of a polypropylene fiber containing nickel was printed on a roller or on a frame. The fabric was dried and steamed for 30 minutes at 105–110° C. The fabric was washed vigorously in a bath of soap and sodium carbonate at the boil and stripped in an alkaline reducing bath. A scarlet shade with good brightness was obtained which possessed excellent fastness to the chlorinated solvents used in dry cleaning and a very good fastness to light.

We claim:
1. Process for the coloration of fibers based on a polymer of an alpha-olefine containing a metal which comprises applying thereto 7-(2',5'-dichlorophenylazo)-6-methyl-8-hydroxy-quinoline.
2. Process according to claim 1 wherein the dyestuff is applied in dispersed form.

3. Process according to claim 1 wherein the coloration is effected by dyeing in an open bath at a temperature of 90° C. to 100° C. in the absence of a vehicle.

4. Process according to claim 1 wherein the coloration is effected by dyeing at 130° C.

5. Process according to claim 1 wherein the polymer is polypropylene.

6. Process according to claim 1 wherein the metal is nickel.

7. Fibers based on a polymer of an alpha-olefine containing a metal colored by 7-(2′,5′-dichlorophenylazo)-6-methyl-8-hydroxy-quinoline.

8. Fibers according to claim 7 wherein the metal is nickel.

9. Fibers according to claim 7 wherein the polymer is polypropylene.

References Cited

UNITED STATES PATENTS 3,222,350   12/1965   May.
3,222,351   12/1965   May.

FOREIGN PATENTS 642,346   5/1964   Belgium.

NORMAN G. TORCHIN, *Primary Examiner.*

DONALD LEVY, *Examiner.*